US008612373B2

(12) United States Patent
Chidlovskii

(10) Patent No.: US 8,612,373 B2
(45) Date of Patent: Dec. 17, 2013

(54) METHOD FOR TRANSFORMING DATA ELEMENTS WITHIN A CLASSIFICATION SYSTEM BASED IN PART ON INPUT FROM A HUMAN ANNOTATOR OR EXPERT

(75) Inventor: Boris Chidlovskii, Meylan (FR)

(73) Assignee: Xerox Corporation, Norwalk, CT (US)

( * ) Notice: Subject to any disclaimer, the term of this patent is extended or adjusted under 35 U.S.C. 154(b) by 658 days.

(21) Appl. No.: 12/792,973

(22) Filed: Jun. 3, 2010

(65) Prior Publication Data
US 2010/0306141 A1  Dec. 2, 2010

Related U.S. Application Data

(62) Division of application No. 11/638,732, filed on Dec. 14, 2006, now Pat. No. 7,756,800.

(51) Int. Cl.
G06E 1/00 (2006.01)

(52) U.S. Cl.
USPC .......................................................... 706/20

(58) Field of Classification Search
USPC .......................................................... 706/20
See application file for complete search history.

(56) References Cited

U.S. PATENT DOCUMENTS

| 2003/0233369 | A1 | 12/2003 | Sassano |
| 2004/0111253 | A1 | 6/2004 | Luo et al. |
| 2004/0162814 | A1 | 8/2004 | Bergholz et al. |
| 2004/0204957 | A1* | 10/2004 | Afeyan et al. ............. 705/1 |
| 2004/0261016 | A1* | 12/2004 | Glass et al. ............. 715/512 |
| 2005/0169529 | A1 | 8/2005 | Owechko et al. |
| 2007/0022373 | A1 | 1/2007 | Chidlovskii et al. |
| 2007/0150801 | A1 | 6/2007 | Chidlovskii et al. |

OTHER PUBLICATIONS

"Confidence-based Dynamic Ensemble for Image Annotation and Semantics Discovery", Beitao Li, Kingshy Goh, Proceeding Multimedia 03 Proceedings of the eleventh ACM, pp. 195-206.*
"Interactive Corpus Annotation", Thorsten Brants, Oliver Plaehn, Computational Linguistics, Saarland University, In Second International Conference on Language Resources and Evaluation LREC-2000, May 31-Jun. 2, 2000, Athens, Greece, 7 pages.*
ALDAI: Active Learning Documents Annotation Interface, Boris Chidlovskii, Jerome Fuselier, Loic Lecerf, Xerox Research Centre Europe, DocEng '06, Oct. 10-13, 2006, Amsterdam, The Netherlands, pp. 184-185.*
Almgren, Magnus and Jonsson, Erland, "Using Active Learning in Intrusion Detection", 17th IEEE Computer Security Foundations Workshop (2004), pp. 88-98.
Berger, Adam L., Pietra, Vincent J. Della, Pietra, Stephen A., "A Maximum Entropy Approach to Natural Language Processing", Computational Linguistics, 22(1):39-71, 1996.

(Continued)

Primary Examiner — Kakali Chaki
Assistant Examiner — Mai T Tran
(74) Attorney, Agent, or Firm — Fay Sharpe LLP

(57) ABSTRACT

A method is provided for transforming data elements within a classification system based in part on input from a human annotator or expert. A first concept evolution model as a training set is composed from a first set of selectively determinable annotations and the first concept evolution model. A trained model is generated after training a learning algorithm with the training set and the concept evolution model. A confidence factor is computed that a predicted annotation is accurately identified. A selected element instance and a corresponding suggested annotation are identified to have a low confidence factor. The classifying of the applied annotation is adjusted where a second concept evolution model is composed for more accurate classifying of the data item.

9 Claims, 4 Drawing Sheets

(56) References Cited

OTHER PUBLICATIONS

Chanod, Jean-Pierre, et al., "From Legacy Documents to XML: A Conversion Framework", *Proceedings of 9th European Conference Research and Advanced Technology for Digital Libraries*, Vienna, Austria, (2005) pp. 92-103.

Chieu, Hai Leong, Ng, Hwee Tou, A Maximum Entropy Approach to Information Extraction from Semi-Structured and Free Text, *American Association for Artificial Intelligence*, Copyright 2002, 7 pages.

Ciravegna, F., Dingli, A., Petrelli, D. and Wilks, Y., "Timely and Non-Intrusive Active Document Annotation via Adaptive Information Extraction", *Proceedings ECAI'02 Workshop Semantic Authoring Annotation and Knowledge Management* (2002), 7 pages.

Finn, Aidan and Kushmerick, Nicholas, "Active Learning Selection Strategies for Information Extraction", *Proceedings ECML '03 Workshop on Adaptive Text Extraction and Mining*, 2003, 8 pages.

Lerman, K., Minton, S., Knoblock, C., "Wrapper Maintenance: A Machine Learning Approach", *Journal of Artificial Intelligence Research*, vol. 18, pp. 149-181 (2003).

Malouf, R., "A comparison of algorithms for maximum entropy parameter estimation", *Proceedings 6th Conference on Natural Language Learning*, (2002) pp. 49-55.

Riccardi G., Hakkani-Tur, D., "Active Learning: Theory and Applications to Automatic Speech Recognition", *IEEE Transactions on Speech and Audiio Processing*, (2005) vol. 13, pp. 504-511.

Joachims, Thorsten, "Text categorization with support vector machines: Learning with many relevant features", *Machine Learning: ECML-98, 10th European Conference on Machine Learning*, p. 137-142 Proceedings, 1998.

Nigam, Kemal; Maccallum, Andrew Kachites; Thurn, Sebastian and Mitchell, Tom, "Text classification from labeled and unlabeled documents using EM", *Machine Learning Journal*, 2000., pp. 1-34.

Merkl, D., "Text Data Mining", *A Handbook of Natural Language Processing: Techniques and Applications for the Processing of Language as Text*, (Editors: R. Dale, H. Moisl and H. Somers) New York: Marcel Dekker, 1998, 26 pages.

Mukherjee et al., "Automatic Annotation of Content-Rich HTML Documents: Structural and Semantic Analysis", 2003., The Semantic Web ISWC, LNCS 2870, pp. 533-549.

\* cited by examiner

METHOD FOR TRANSFORMING DATA ELEMENTS WITHIN A CLASSIFICATION SYSTEM BASED IN PART ON INPUT FROM A HUMAN ANNOTATOR OR EXPERT

INCORPORATION BY REFERENCE

This application is a divisional application of U.S. application Ser. No. 11/638,732 filed Dec. 14, 2006, the entire disclosure of which is incorporated herein by reference.

BACKGROUND

The subject development relates to active learning methods and classifying systems for data items such as structured document systems and especially to such systems for adjusting a classifier for document systems wherein the documents or portions thereof can be characterized and classified for improved automated information retrieval. The development relates to a system and method for annotating document elements or adjusting classes of the classifier for the document data elements so the document and its contents can be more accurately categorized and stored, and thereafter better accessed upon selective demand.

In legacy document systems comprising substantial databases, such as where an entity endeavors to maintain an organized library of semi-structured documents for operational, research or historical purposes, the document files often have been created over a substantial period of time and storage is primarily for the purposes of representation in a visual manner to facilitate its rendering to a human reader. There are often no corresponding annotations to the document to facilitate its automated retrieval by some characterization or classification system sensitive to a recognition of the different logical and semantic constituent elements.

Accordingly, these foregoing deficiencies evidence a substantial need for somehow acquiring an improved system for logical recognition of content and semantic elements in semi-structured documents for better reactive presentations of the documents and response to retrieval, search and filtering tasks.

Concept models for annotating such systems usually start with a training set of annotations that can identify element instances in the document or data item being classified, for example, element instances such as author, title or abstract. Such annotations correspond to identification of distinctive features that can be determined to collectively define a class of the element instance which in turn can be interpreted to suggest the appropriate annotation. The training set originates from an annotator/expert involved in the classifying of the data items.

As the complexity and voluminous extent of documents or data collections increase, the difficulties in accurately and quickly classifying the data items in the collections as well as elements in the documents also increase. Better models for the annotating process need to be developed, which if were obtained through only manual efforts of the annotator/expert, would result in highly undesirable inefficiencies in evolving the annotating model. Accordingly, there is a need for a better machine implemented active learning method for evolving a classifier.

The subject development thus also relates to machine training of a classifying system. A wide number of machine learning techniques have also been applied to document classification. An example of these classifiers are neural networks, support vector machines [Joachims, Thorsten, "Text categorization with support vector machines: Learning with many relevant features", *Machine Learning: ECML*-98. 10$^{th}$ European Conference on Machine Learning, p. 137-42 Proceedings, 1998], genetic programming, Kohonen type self-organizing maps [Merkl, D., "Text classification with self-organizing maps: Some lessons learned", *Neurocomputing* Vol. 21 (1-3), p. 61-77, 1998], hierarchical Bayesian clustering, Bayesian network [Lam, Wai and Low, Kon-Fan, "Automatic document classification based on probabilistic reasoning: Model and performance analysis", *Proceedings of the IEEE International Conference on Systems, Man and Cybernetics*, Vol. 3, p. 2719-2723, 1997], and Naïve Bayes classifier [Li, Y. H. and Jain, A. K., "Classification of text documents", *Computer Journal*, 41(8), p. 537-46, 1998]. The Naïve Bayes method has proven its efficiency, in particular, when using a small set of labeled documents and in the semi-supervised learning, when the class information is learned from the labeled and unlabeled data [Nigam, Kamal; Maccallum, Andrew Kachites; Thrun, Sebastian and Mitchell, Tom, "Text Classification from labeled and unlabeled documents using EM", *Machine Learning Journal*, 2000].

Active learning refers to a framework where the learning algorithm selects the instances to be labeled and then included in the training set. It often allows a significant reduction in the amount of training data needed to train a supervised learning method. Instead of annotating random instances to produce the training set, the active learning suggests to annotate those instances that are expected to maximally benefit the supervised learning method.

The conventional principle of active learning assumes a predefined and fixed concept definition, where the concept refers to the set of classes and their interpretation. The most traditional situation is one of evaluation testbeds, where the concept is predefined and given by a set of classes and a fully annotated collection of examples. Such testbeds are used in different domains in order to test, compare, and eventually improve existing machine learning techniques.

The concept evolution for the annotating model is a change in the class set or a shift in their interpretation. Current systems disallow any concept evolution since any change makes inconsistent the previous concept, along with the associated learning model and training sets. It often requires to restart the training process or, in the best case, to revise a part of the training set concerned with the change.

On the other hand, a possibility to evolve a concept appears as very important in real applications. It often originates from the complexity of input collections and a certain flexibility or even fuzziness in the task definition. For example, in the domain of meta-data extraction from digital and scanned documents and the semantic annotation of Web pages, the design of a learning model starts with some initial "idea" and often goes through a sequence of different corrections and adjustments. Such evolution of the concept may be critical in pursuing the following goals:

1. Refining the problem in a way that better corresponds to given collections, including a discovery of a hidden knowledge (new elements, finer interpretation of existing ones, relations between elements, etc.) that can beneficial for the final application, for faster learning, etc.

2. Better matching quality constraints, imposed by the pricing and contracting causes. It is often preferable to recognize instances of a sub-class AA with 98% accuracy, than instances of a super-class A with accuracy 70%.

3. If the modeling task is shared between different partners that follow (slightly) different concept definitions, the unification of their efforts and models might impose something similar to a concept change.

4. If the deployment of extracted data is changed due to some external reasons, like the domain ontology update.

Unfortunately, any concept change makes a part of the annotations inconsistent. If the investment in annotated samples has been important, retraining a model from scratch represents a substantial cost. To avoid the restart of the process or the re-annotation of "become-inconsistent" training examples, an active learning principle can assist a designer in pivoting the system toward the new concept definition and tuning up the associated learning model.

Accordingly, there is a need for improved methods and systems for retraining a maximum entropy classifier when incremental changes are made to the definitions of the classes it must detect. The retraining should occur in an active learning framework and the system may choose new instances to be annotated in order to increase classification accuracy with less effort from human annotators.

SUMMARY

According to aspects illustrated herein, there is provided a method for adjusting a system for classifying a data item in a data collection or an element instance within a document. Any element instance in the document is associated with a set of features indicative of accurate identification of the element instance. A training set comprising a subset of elements within the document labeled with class labels is provided to train a learning method for predicting class labels for unlabeled elements. If an accurate prediction of the class for the element instance is achieved, then the element instance can be accurately annotated so that the item can be identified with the set of predicted classes for selected element instances. Upon the identification of the data item with the training set, a confidence factor is computed that a selected element instance is accurately identified by the predicted class. When a selected element instance has a low confidence factor, a human annotator/expert is queried for a true class label of the instance. The training set is extended with the true labeled instance, iterating the identifying and computing for other element instances with low confidence factors is executed and a human annotator/expert is queried for a true class label of the instance. The training set is extended with the true labeled instance.

The changing of the features for the predicted class comprises an annotator/expert generating a concept evolution command for the redefining of the predicted class. The generated concept evolution command adjusts the training set class in an incremental manner so that a part of a feature definition for the changed predicted class is common with the training set class feature definition.

In accordance with another illustrated aspect, two different methods are disclosed for the changing and retraining of the subject classifying system, including a local approach and a global approach. The local approach associates a local model for each evolution command. The global approach includes an associated global model for the most recent changing of the associate features for the predicted class comprising issuing of a concept evolution command by the annotating expert.

According to further aspects illustrated herein, there is provided a method for evolving an annotating model for classifying a data item. A first annotating model is a composed as a training set comprised of a first set of selectively determinable annotations detectable within the document and the first concept evolution model. A learning algorithm is trained with the training set and the concept evolution model to predict classes for unlabeled elements within the document. The data item is then annotated with the training set by selectively applying annotations to selected element instances. A confidence factor is computed that the applied annotation is accurate. When an element instance is identified such that a corresponding applied annotation has a low confidence factor, the applied annotation is adjusted by changing the classifying defining features of the selected item. A second annotating model is then composed for more accurate classifying of the data item.

The composing and adjusting of the model are executed by a designer of the annotating model while the computing is machine implemented. The computing comprises determining a probability that a detected element instance corresponds to a predetermined class, and when these probabilities for all classes correspond to the confidence factor satisfying the predetermined condition of the uncertainty, the class is suggested for further annotating to the annotator/expert.

DETAILED DESCRIPTION

Figure 1:
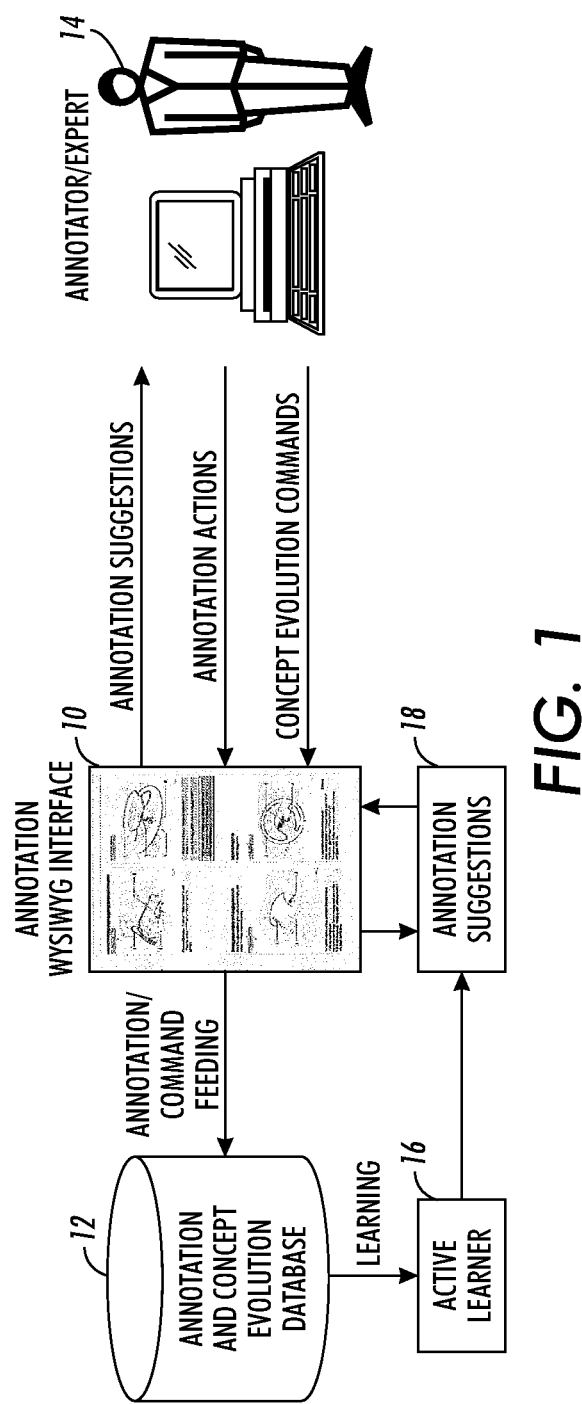
FIG. 1 is a schematic representation of a classifying system that can be evolved through involvement of an annotator/expert and an active learning system.

The subject developments relate to evolving/retraining methods that can be integrated into an active learning framework so that the classifying system can choose element instances to be alternatively annotated in order to increase classification accuracy with less effort from human annotators. Such classifying systems have an overall purpose of better organizing/storing/retrieving data items such as documents or computer stored records. The basic component for applying different annotation strategies in such systems is a supervised probabilistic algorithm and associated classifier C. Such cases typically consider the extraction of document fragments, like words/lines/segments in scanned and OCR-ed documents and words/leaves/sub-trees in HTML documents. For each unlabeled element (unannotated) element x in a source document, classifier C estimates conditional probabilities $P(y_i|x)$ for all classes $y_i \in Y$. The basic probabilistic algorithm can be one of the following: the k-Nearest Neighbor, the Maximum Entropy, the multi-class Support Vector Machines, an assembly method, etc.

To produce probabilistic estimates for the element x, a Maximum Entropy framework is adopted, according to which the best model for estimating probability distributions from data is the one that is consistent with certain constraints derived from the training set, but otherwise makes the fewest possible assumptions. The distribution with the fewest possible assumptions is one with the highest entropy, and closest to the uniform distribution. Each constraint expresses some characteristic of the training set that should also be present in the learned distribution. The constraint is based on a binary feature, it constrains the expected value of the feature in the model to be equal to its expected value in the training set.

One important advantage of maximum entropy models is their flexibility, as they allow the extension of the rule system with additional syntactic, semantic and pragmatic features. Each feature f is binary and can depend on y∈Y and on any properties of the input elements x. In the case of textual annotation, the core features that express properties on the fragments, like $f_1(x, y)$="1 if y is title and x has less then 10 words, 0 otherwise" are considered.

With the constraints based on the selected features f(x,y), the maximum entropy method attempts to maximize the conditional likelihood of P(y|x) represented as an exponential model:

$$P(y \mid x) = \frac{1}{Z_\alpha(x)} \exp\left(\sum_\alpha \lambda_\alpha \cdot f_\alpha(x, y)\right) \quad (1)$$

where $Z_\alpha(x)$ is a normalizing factor to ensure that all the probabilities sum to 1, $$Z_\alpha(x) = \sum_y \exp\left(\sum_\alpha \lambda_\alpha f_\alpha(x, y)\right) \quad (2)$$

For the iterative parameter estimation of the Maximum Entropy exponential models, one often selects the quasi Newton methods, namely the Limited Memory BFGS method, which is observed to be more effective than the Generalized Iterative Scaling ("GIS") and Improved Iterative Scaling ("IIS") for NLP and information extraction tasks.

The active learning process by which the classifying concept model evolves involves an adoption of a major active learning principle, namely uncertainty based sampling. It is based on measuring the learner confidence on unlabeled instances. According to the principle, the classifier would benefit more on labeling and including instances on which it is more uncertain (i.e., less confident) when attempting to classify them. Uncertainty sampling reasons using probabilities $P(y_i|x)$ are assigned by the classifier C to every possible class $y_i \in Y$ on each unlabeled observation x.

The learner confidence of its predictions are measured using the maximum entropy (ME) principle. Given a probability distribution $P(y_i|x)$ for an observation x, the ME-confidence metric is defined as follows:

$$\mathrm{conf}_{me}(x) = \sum_i P(y_i \mid x) \log P(y_i \mid x) \quad (3)$$

The ME-confidence metric yields negative values; it approximates 0 as the classifier becomes certain of its decision and returns low negative values for observations where the classifier is uncertain. There is no minimal value for $\mathrm{conf}_{me}(x)$. Indeed, it depends on a number of classes in Y, $$\inf_{x \in X} \times \mathrm{conf}_{me}(x) = \log|Y|,$$

where |Y| is the number of classes in Y.

To cope with varying number of classes, below we propose a normalized version of the ME-confidence metric is proposed. The normalized version returns values between −1 (the maximum uncertainty) and 0 (the maximum certainty) for x:

$$\mathrm{conf}_{me}^n(x) = \frac{1}{\log|Y|} \sum_i P(y_i \mid x) \log P(y_i \mid x) \quad (4)$$

Once the confidence values are obtained according to the above metric for all unlabeled observations x, the m most uncertain observations denoted $x_i^u$, i=1, . . . , m are proposed to the designer (or a qualified annotator/expert), possibly with their projection on the document rendering. Once the designer labels all or some of $x_i^u$ with classes y∈Y; the labeled instances ($x_i^u$, y) update the training set thus allowing retraining of the model, and can iteratively identify a new set of the most uncertain observations, and so on.

Concept Evolution

With particular reference to FIG. 1, it can be seen that data item 10 intended to be classified is initially annotated in accordance with a training set of predicted classes to be associated with element instances within the data item 10. Data item 10 is interfaced (what you see, is what you get interface "WYSIWYG") with the annotation and concept evolution database 12 and an annotator/expert 14. The database 12 is further associated with an active learning system 16 which detects element instance features within the data item 10 for computing a confidence factor that the initial training set of predicted classes defined by element instance features within the data item, is acceptably accurate. For those instances having an undesirable confidence factor, as herein to be more fully explained, the active learner 16 suggests alternative annotation/classification 18 for the element instance which can be communicated to the annotator/expert 14 who will make annotation actions by executing concept evolution commands.

It is assumed that the classifying model concept C evolves through a sequence of elementary events $e_n$, n=1, . . . , N where event $e_n$ transforms the previous concept into a new one, $C_n = e_n(C_{n-i})$. Accordingly, each event $e_n$ transforms the previous concept's class set $Y^{n-1}$ into the new one, $Y^n$. Each event is explicitly declared by the designer and is assumed to be one of the following operations:

split (y, $y_1$, . . . , $y_k$), k>=2, replaces an existing class y∈$Y^{n-1}$ with two or more classes $y_1$, . . . , $y_k$, $Y^n = \{Y^{n-1} - y\} \cup \{y_1, \ldots, y_k\}$.

add(y,{$y_1$, . . . , $y_k$}), k>=2, adds a new class y. If the optional list of classes {$y_1, \ldots, y_k$} is given, instances of y may be among those previously annotated with those classes. In no classes are given, class y can interfere with any class in $Y^{n-1}$. The operation updates the class set as $Y^n = Y^{n-1} \cup y_n$.

merge (y, $y_1$, . . . , $y_k$), k>=2, merges two or more existing classes $y_1$, . . . , $y_k \in Y^{n-1}$ into a new class y, $Y^n = \{Y^{n-1} \cup y\} - \{y_1, \ldots, y_k\}$.

remove (y, {$y_1$, . . . , $y_k$}), removes class y from $Y^{n-1}$, $Y^n = Y^{n-1} - y_n$. If the optional class list {$y_1, \ldots, y_k$} is given, instances of y may be inherited by any of those classes. If no classes are given, instances of class y may be inherited by any class remaining in $Y^n$.

The above four operations are considered as a core set which can satisfy all major needs to express the concept evolution process. However, other operations may be included and are intended to be within the scope of this disclosure. For example, this operation set can be extended with a minimal effort by similar or derivate operations, like class renaming, shifting, etc.

Concept Evolution DAG

Figure 2:
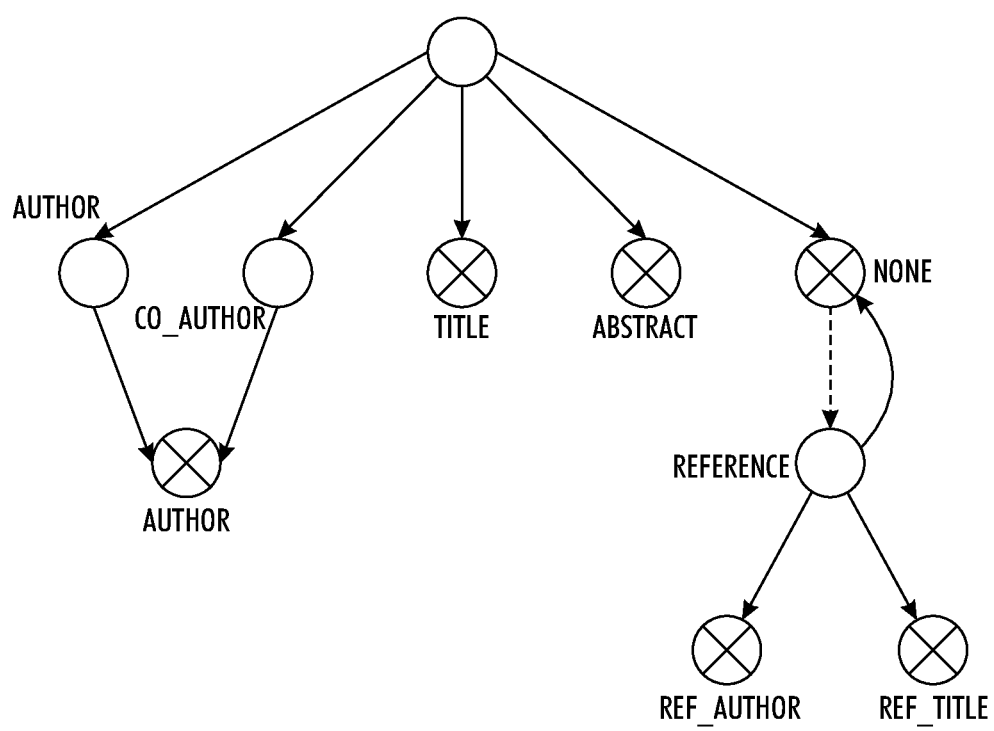
FIG. 2 is an exemplary directed acyclic graph ("DAG") showing a concept evolution within a classifying system.

Directed acyclic graphs are useful representations of the evolution of learning concepts. The concept evolution DAG has a unique root referring to step n=0. Each node in the DAG corresponds to a class occurring at least once during the evolution. There exist two types of arcs in the DAG. Solid arcs are associated with operations split and merge; doted arcs are used for operations add and remove (FIG. 2). A solid arc is interpreted as a replacement of the arc's source class with the target class (and possibly sharing this function with other classes). For a dotted arc, both source and target classes coexist, with the target class being a spin-off of the source one.

For any given DAG, the set of the most recent concept $C^N$ is determined in a unique way. FIG. 2, explicitly indicated classes of $Y^N$ in the DAG.

The operations update the DAG as follows. Any operation add $\{y,\{y_1,\ldots,y_k\}\}$ adds a node for y and connects all nodes $y_1,\ldots,y_k$ to the new node by dotted arcs. Split $(y, y_1,\ldots,y_k)$ creates k new nodes for $y_1,\ldots,y_k$ and connects node y to the new nodes with sold links. Remove $(y, \{y_1,\ldots,y_k\})$ creates no nodes but connects the node for y to all nodes $y_1,\ldots,y_k$ by solid links. Finally, merge $(y, y_1,\ldots,y_k)$ creates a new node for class y and links all nodes $y_1,\ldots,y_k$ to node y by solid links.

Split, merge and delete operations erase one or more classes and make associated annotations obsolete. Add operation erases no classes, though it makes certain annotations obsolete.

For example, assume the designer builds a learning model for meta-data extraction from collections of scientific publications. FIG. 2 shows the DAG of the concept evolution. As the initial concept $C^1$, the designer selects classes, author, co-author, title, abstract and None. Then, after a deeper analysis of the documents, the designer decides to add the reference class (with add(reference, None,) operation). Next, the designer realizes that references have an inner structure and the designer needs only ref_title and ref_author within reference (add(ref_title,title) and (add(ref_author,title,), while the designer is not interested in other fragments of references (remove(reference, None)). Finally, when the model is trained, the client comes to require the merge of authors and co-authors (merge(author,author,co_author)) in order to easily map the extracted instances into the application ontology. The final concept $C^4$ includes six classes, author, title, abstract, ref_author, ref_author and None.

Figure 3:
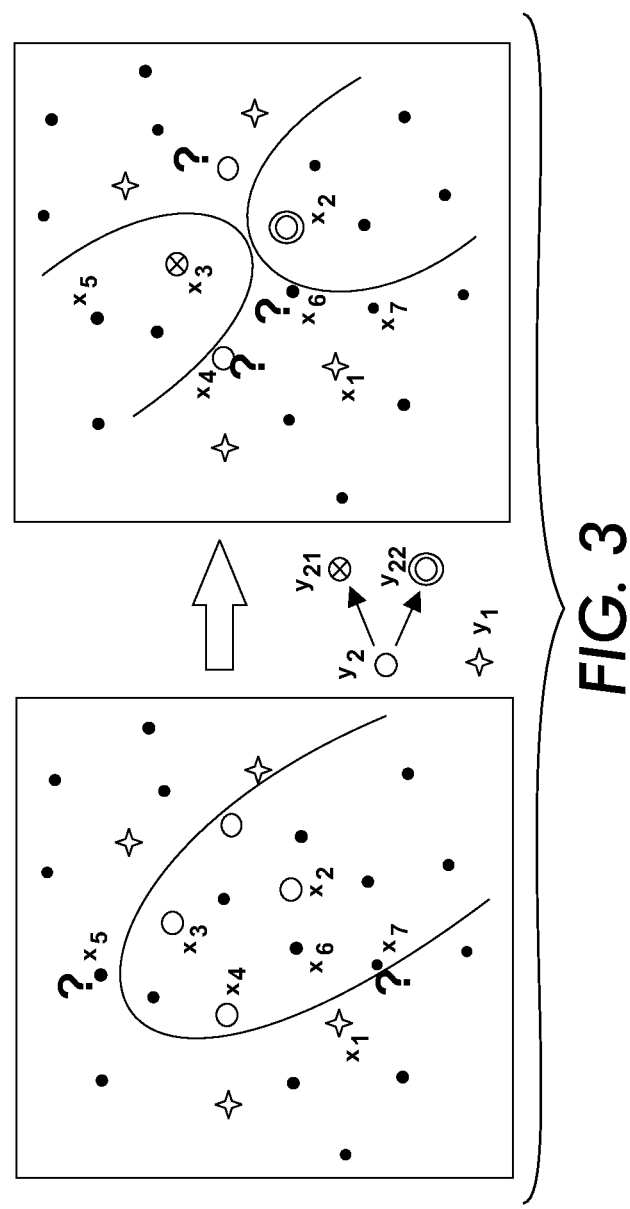
FIG. 3 is a diagrammatic illustration of a split evolution command in the associated features space for a training set class.

For example, assume the designer is training a model that separates instances of two classes $y_1$ and $y_2$, represented by stars and circles in FIG. 3. The model function is defined as a complex curb (or non-linear SVM kernels), and an active learning principle is used to estimate the parameters for the optimal separation curb. In FIG. 3, question marks point to the most uncertain elements according to the last model trained with the available training set. Table 1 reports details on some instances x and uncertainty estimation. It shows four instances $x_1$ to $x_4$ annotated with classes $y_1$ and $y_2$ (marked with ✓) and at least three unlabeled instances $x_5$ to $x_7$. Core features $f_1$ to $f_3$ are reported for all instances and are used to train the basic learning algorithm and evaluating the normalized ME-confidence $\mathrm{conf}_{me}^n(x)$. Observation $x_7$ is the most uncertain and therefore is the top candidate for new labeling.

TABLE 1

The model training board before the split command.

| Instances | Annot status | Features | | | Class/Prediction | | $f_{me}^{norm}$ con (x) |
|---|---|---|---|---|---|---|---|
| | | $f_1$ | $f_2$ | $f_3$ | $y_1$ | $y_2$ | |
| $X_1$ | valid | 5 | arial | 23 | ✓ | | 0.00 |
| $X_2$ | valid | 7 | times | 7 | | ✓ | 0.00 |
| $X_3$ | valid | 1 | arial | 6 | | ✓ | 0.00 |
| $X_4$ | valid | 8 | arial | 15 | | ✓ | 0.00 |
| $X_5$ | no | 8 | times | 13 | 0.6 | 0.4 | −0.97 |
| $X_6$ | no | 9 | times | 9 | 0.25 | 0.75 | −0.81 |
| $X_7$ | no | 5 | arial | 20 | 0.45 | 0.55 | −0.993 |
| … | … | … | … | … | … | … | … |

Assume now that the designer decides to split the class $y_2$ into two subclasses, $y_{21}$ and $y_{22}$. Assume that $x_2$ and $x_3$ previously marked as $y_2$ have been re-annotated as $y_{2,2}$ and $y_{2,1}$, respectively (see FIG. 3). All other examples of $y_2$ including $x_4$ become inconsistent.

Provided that the designer keeps the same class of curves to separate instances of three classes, the concept migration endeavors to quickly and with minimal effort turn around the models and training sets to capture the new concept and to efficiently manage the sets of valid and obsolete annotations and unlabeled elements.

Two methods discussed below address these and other issues in order to support the concept evolution. One, a so-called local approach creates a local model for one or few events $e_n$ in the concept evolution. Once a local model is created, its definition (the set of classes) remains unchanged till the end. Moreover, the associated training set $S_n$ can be extended with new examples, but no annotations can become inconsistent within the model. Instead, the local models are assembled in order to make the uncertainty predictions $\mathrm{pred}_{me}^n(y_i^N|x)$ for the most recent concept $C^N$.

The alternative, global approach maintains a unique model addressing the most recent concept $C^N$. At any evolution event $e_n$, the global approach re-shapes the list of classes, according to the event. In order to cope with three sets of valid, inconsistent and unlabeled instances, the global approach extends the core feature set f(x,y) with evolution-relevant features $f^{ev}(n,x,y)$.

With reference to the local approach, one local model is associated with each of the evolution events $e_n$, which in turn can be expressed by a group of operations introduced in the previous section. There exists a minimal set of local models covering the entire evolution process, and this minimal set can be uniquely determined from the sequence of evolution events. In such a minimal set, each event model $M^n$ corresponds to an internal node of the concept evolution DAG that has at least one dotted or two solid outgoing arcs.

There are three main issues relevant to the local approach:
1. How to combine the local predictions of local models $M^n$, n=1,…, N in order to get confidence estimations for the most recent model $C^N$?
2. How to propagate newly labeled instances of $C^N$ back to training sets $S^n$ of event models?
3. How to manage training sets $S^n$ which are not aligned (what is a valid annotation for one event model may be an unlabeled instance for another one)? Can new annotation examples get in conflict with older examples?

For each class $y_i^N \in Y^N$ in the most recent concept $C^N$, we consider the set Π of simple (directed) paths in the DAG leading from the root to node $y_i^N$ is considered. For each path $\pi \in \Pi$, all inner nodes in the DAG composing the path π, and corresponding event model $M^j$ are considered. For each event model $M^j$ in the path, one denotes as $y_i^j$ a class from $Y^j$ that "follows" the path π. This class $y_i^j$ is actually an ascendant of $y_i^N$ on $C^j$. Using estimations $P^j(y_i^*|x)$ by event models, one can estimate $P(y_i^N|x)$ as follows:

$$P(y_i^N \mid x) = \sum_{\pi \in \Pi} \prod_{j \in \pi} P^j(y_i^j \mid x) \quad (5)$$

To work with unaligned training sets $S^n$, one treats all obsolete and unlabeled examples in a uniform manner. For each training example $(x, y) \in S^n$, we consider that $P(y|x)=1$ and $P(y'|x)=0$ for all classes $y'$ different from $y$, $y' \in Y^n$.

Finally, once a low confidence instance $x^u$ gets annotated with class $y_i^N$, the annotation $(x^u, y_i^N)$ is propogated to all local models as follows. For all paths $\pi \in \Pi$ we consider the corresponding local models $M^j$ and ascendant classes $y_i^j$ for $y_i^N$ are considered. Then we update training sets $S^n$ with projected samples $(x^u, y_i^j)$.

An active learning algorithm for the local approach comprises, while (labeling and unlabeled instances are available):
Train all event models $M^n$ with associated training sets $S^n$
Classify all unlabeled instances x and obsolete annotations
Use models' estimations to get the most recent estimates using (5)
Calculate the uncertainty using the normalized ME-uncertainty metric using (4)
Select the m most uncertain instances $x_I^u I=1, \ldots, m$
Ask an expert to label the selected instances $x_I^u$
Project the labeled examples $(x_I^u, y_i^N)$ on the local models $M^j$ and update the local training sets $S^j$ with $(x_I^u, y_i^j)$ Considering the example DAG in FIG. 2 and the most recent model $C^4$ with the class set $Y^4=\{$author, title, abstract, ref_author, ref_title, None$\}$. One can dispose three event models associated with inner no-split nodes in the DAG. The first local model $M^1$ is associated with the DAG root. It classifies instances x into classes $Y^1=\{$author, co-author, title, abstract, None$\}$. The local model $M^2$ is associated with the inner node None and is intended to recognize reference instances. Finally, the local model $M^3$ is dedicated to recognizing ref_author and ref_title within references. Assume each of these models produce corresponding predictions. Finally, the inner nodes for author and co-author form no local models since they have only one solid outgoing arc.

For the most recent model with $Y^4$:

$P(\text{author}|x) = P^1(\text{author}|x) + P^1(\text{co\_author}|x)$ $P(\text{title}|x) = P^1(\text{title}|x)$ $P(\text{abstract}|x) = P^1(\text{abstract}|x)$ $P(\text{ref\_author}|x) = P^1(\text{None}|x) \times P^2(\text{reference}|x) \times P^3(\text{ref\_author}|x)$ $P(\text{ref\_title}|x) = P^1(\text{None}|x) \times P^2(\text{reference}|x) \times P^3(\text{ref\_title}|x)$ $P(\text{None}|x) = P^1(\text{None}|x) \times (1 - P^2(\text{reference}|x) \times \times (P^3(\text{ref\_author}|x) + P^3(\text{ref\_author}|x))$ Any element x annotated with class $y_i^N \in Y^N$ can contribute in annotation for one or more local models. In the above example, an element x labeled as ref_title results in including three annotation pairs for three local models: (x,None) for $M^1$, (x,reference) for $M^2$, and (x,ref_title) for $M^3$.

Figure 4:
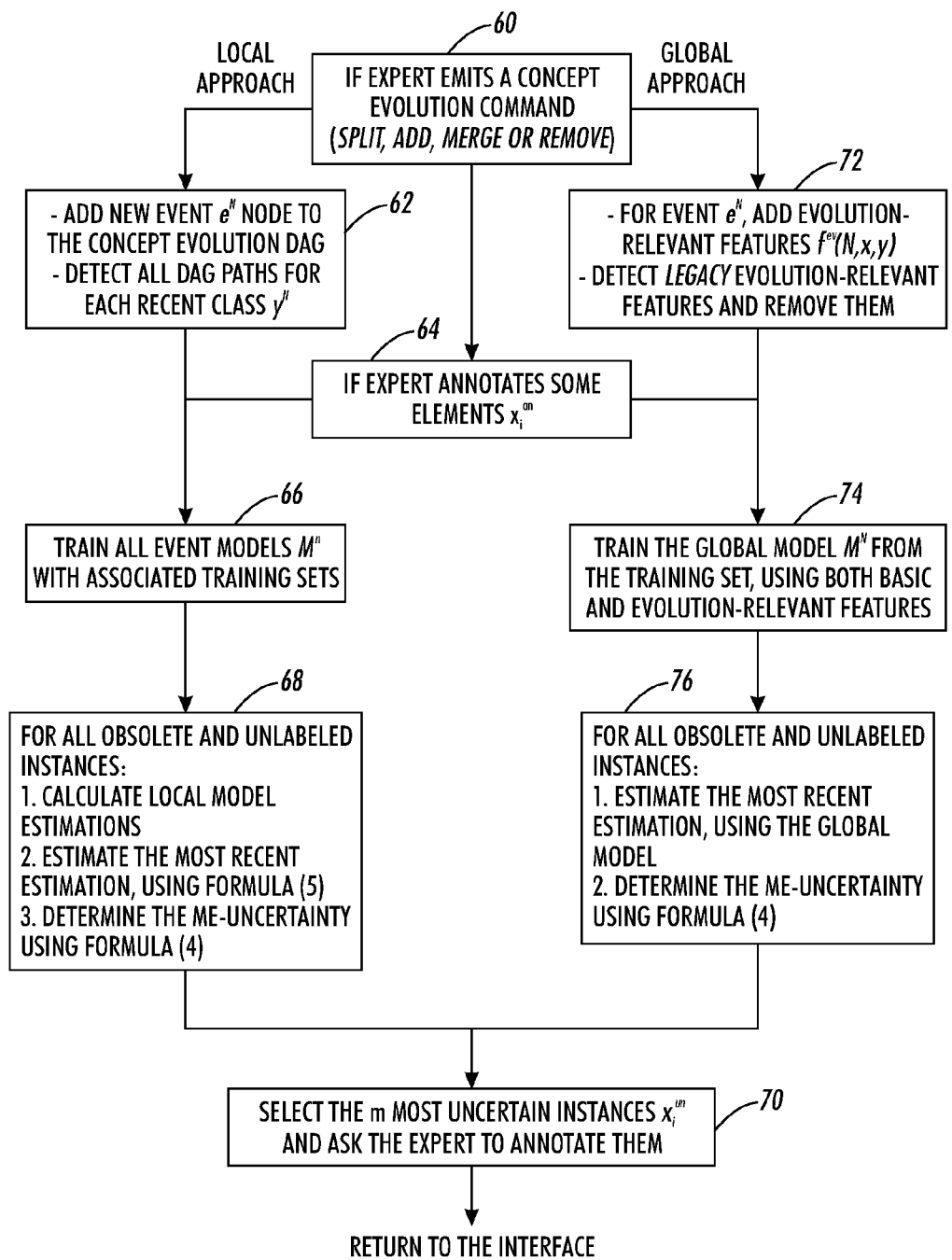
FIG. 4 is a flowchart illustrating two methods for adjusting or retraining a maximum entropy classifier by making incremental changes to definitions of classes that the classifier must detect.

With reference to FIG. 4, it can be seen that local approach is implemented by the expert first emitting 60 a concept evolution command. A new event $e^N$ node is added 62 to the concept evolution DAG and all DAG paths for each recent class $y^N$ are detected. If the expert has annotated 64 some of the elements $x_i^{an}$, then all event models $M^n$ need be trained 66 with the associated training sets. For obsolete and unlabeled element instances, local model estimations are calculated 68; using formula (5) the most recent estimations are estimated and the ME-uncertainty is determined using formula (4). The m most uncertain instances $x_i^u$ are then selected and communicated to the expert for annotator/expert annotation 70 of them.

With reference to the global approach, it maintains a unique model that addresses the most recent concept definition. At each evolution event, it changes the set of classes according to the operation issued and takes care of annotations that become obsolete. This is achieved through a dedicated feature extraction mechanism. It extends the conventional set of features $f(x,y)$ describing the observations with evolution-relevant features $f^{ev}(n,x,y)$.

The partial evidence of obsolete annotations are captured by introducing special features and adding them to the feature set used by the exponential model. The evolution-relevant features depend on the operation issued at step n:
For add $(y, y_1, \ldots, y_k)$ and merge$(y, y_1, \ldots, y_k)$, k features $f_n^{ev}(x, y_k)$ are added. $f_n^{ev}(x, y_k)$ is 1 if $x_i$ was annotated as $y_k$ before step n, and 0 otherwise.
For split $(y, y_1, \ldots, y_k)$ and remove$(y, y_1, \ldots, y_k)$, one feature $f^{ev}(n,x,y)$ is added; it is 1 if $x_i$ was annotated as y before the command was issued, 0 otherwise.

For example, according to the global approach, a set of core features $F=\{f_1, f_2, f_3\}$ is extended with the evolution feature $f^{ev}(n,x,y_2)$ that returns 1 of x was annotated as $y_2$ before the split, and 0 otherwise. Then one trains the exponential model with the feature set $F' = F \cup f^{ev}(n,x, f_2)$ and evaluates the uncertainty for all obsolete and unlabeled elements. Details of the new evaluation are reported in Table 2. According to it, the split reshapes the landscape of element uncertainty, with element $x_6$ becoming the most uncertain one, and not $x_7$ any longer.

The global approach has a benefit of maintenance of evolution features which are associated over relationships over

TABLE 2

The uncertainty estimation after the split.

| Instances | Annot status | Features | | | | Class/Prediction | | | con |
|---|---|---|---|---|---|---|---|---|---|
| | | $f_1$ | $f_2$ | $f_3$ | $f^e(y_2)$ | $y_1$ | $y_{2,1}$ | $y_{2,2}$ | $f_{me}^n$ |
| $X_1$ | valid | 5 | arial | 23 | 0 | ✓ | | | 0.0 |
| $X_2$ | valid | 7 | times | 7 | 1 | | | ✓ | 0.0 |
| $X_3$ | valid | 1 | arial | 6 | 1 | | ✓ | | 0.0 |
| $X_4$ | obsolete | 8 | arial | 15 | 1 | 0.0 | 0.62 | 0.38 | −0.60 |
| $X_5$ | no | 8 | times | 13 | 0 | 0.6 | 0.25 | 0.15 | −0.85 |
| $X_6$ | no | 9 | times | 9 | 0 | 0.25 | 0.40 | 0.30 | −0.97 |
| $X_7$ | no | 5 | arial | 20 | 0 | 0.45 | 0.45 | 0.1 | −0.86 |
| ... | ... | ... | ... | ... | ... | ... | ... | ... | ... | the evolution process. They are volatile and some or all of these features may become useless at some point and can be dropped off, for the sake of reduction of the space and calculation time, performance of ME algorithm.

An evolution feature $f^{ev}(n,x,y_k)$ is called legacy if there is no instance x which status is partial and $f^{ev}(n,x,y_k)=1$. One can show that any legacy evolution feature can dropped from the feature set without any harm to the model performance. To keep track of evolution features, one maintains an index of obsolete annotations and check for legacy features before any model re-training.

With reference to FIG. 4, it can be seen that upon an expert emitting a concept evolution command 60 for an event $e^N$, evolutionary relevant features $f^{ev}(N,x,y)$ are added and the legacy evolution-relevant feature is detected and removed 72. If the expert has annotated some elements $x_i^{an}$ 64, then the global model $M^N$ must be trained from the training set using both basic and evolution-relevant features 74. For obsolete and unlabeled instances the global model is used for estimating a most recent estimation 76 and determination of the ME-uncertainty using formula (4). Thereafter, the m most uncertain instances $x_i^{un}$ are selected and the annotator/expert annotates them.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for evolving an annotating model for classifying a document or a data item therein, comprising:
   composing a first concept evolution model as a training set comprised of a first set of selectively determinable class labels of element instances within the document that are detectable within the document to produce a result of predicting class labels to be assigned to unlabeled element instances and the first concept evolution model;
   training a learning algorithm with the training set and the concept evolution model to generate a trained model wherein the learning algorithm comprises a global approach to reshape a list of the classes and adjusts the set of features, or wherein the learning algorithm comprises a local approach that creates a local model of one or few events, the definition set of classes remains unchanged, and the training set can be extended with new examples;
   using the trained model to predict class labels for unlabeled element instances within the document;
   computing a confidence factor for a predicted class label is accurately predicted for unlabeled elements;
   identifying an unlabeled element instance within the document with a corresponding suggested annotation having a confidence factor less than zero; and
   adjusting the classifying of the unlabeled element instance wherein a second concept evolution model is composed for more accurate classifying of the document, and wherein the composing and applying are executed by a designer of the annotating model and the computing is machine implemented.

2. The method of claim 1 wherein the composing comprises associating a class with detectable annotations.

3. The method of claim 2 wherein the computing comprises determining a probability that a detected annotation corresponds to a class, and when the probabilities for all classes correspond to the confidence factor satisfying the predetermined condition of the uncertainty, suggesting annotating of the class to an annotator or expert.

4. The method of claim 3 wherein the adjusting comprises the local approach concept evaluation comprising associating a local model for each evolution event including a concept evolution command.

5. The method of claim 4 wherein the associating a local model comprises corresponding an event model to an internal mode of a concept evolution DAG.

6. The method of claim 3 wherein the adjusting comprises a global approach concept evolution including associating a global model for a most recent changing of the associate features for the predicted class comprising issuing of a concept evolution command by the annotator or expert.

7. The method of claim 6 wherein the associating a global model comprises changing the set of classes in accordance with the issued concept evolution command and removing annotations for the data items that are obsolete from the changing.

8. The method according to claim 1, wherein the confidence factor is calculated using the formula:

$$conf_{me}(x) = \sum_i P(y_i \mid x) \log P(y_i \mid x).$$

9. The method according to claim 1, wherein the confidence factor is normalized using the formula:

$$conf_{me}^n(x) = \frac{1}{\log|Y|} \sum_i P(y_i \mid x) \log P(y_i \mid x).$$

* * * * *